UNITED STATES PATENT OFFICE 2,660,855

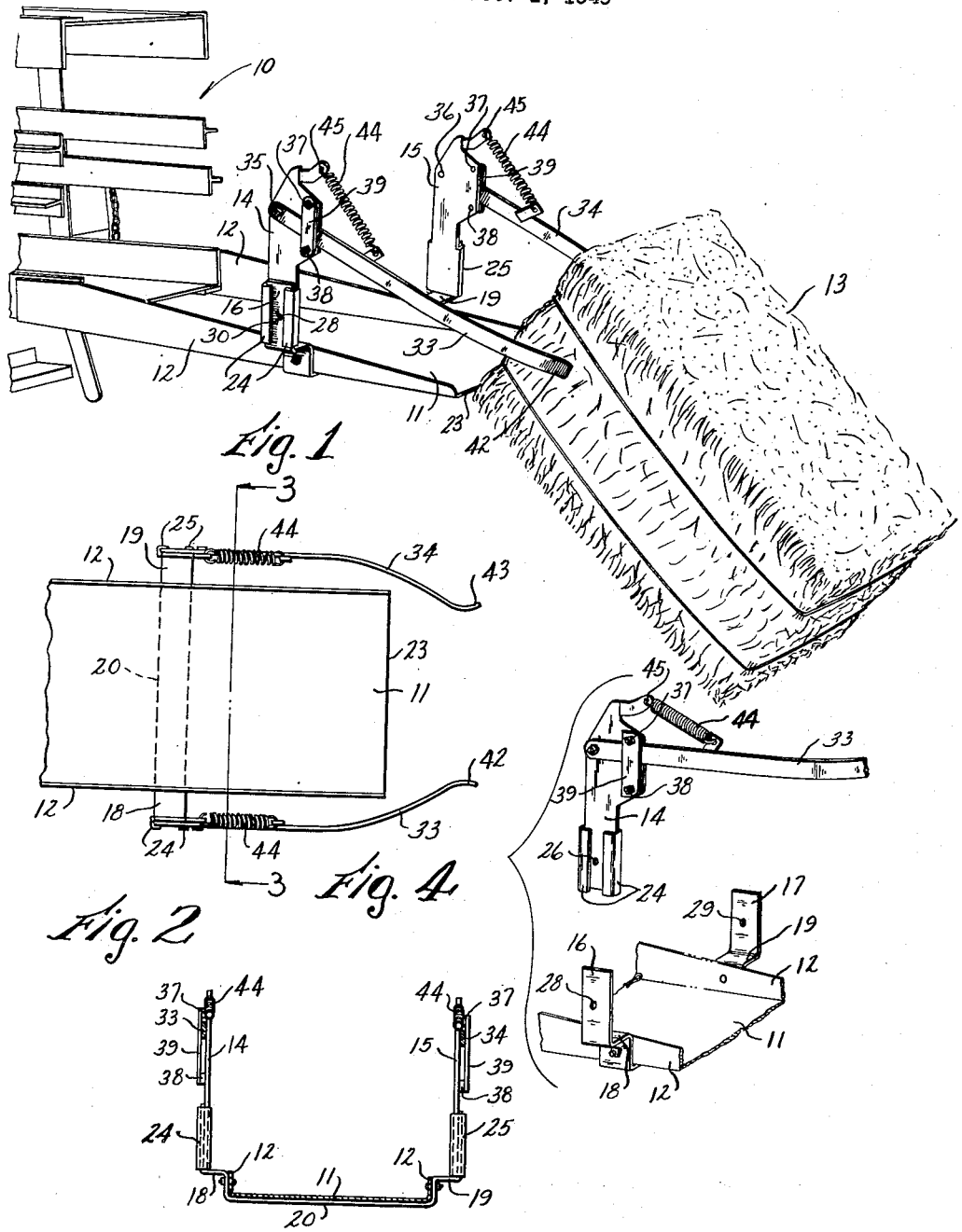

HAY BALE DEPOSITING DEVICE

George A. Voight, Shiocton, Wis.

Application December 1, 1949, Serial No. 130,458

10 Claims. (Cl. 56—473.5)

This invention relates to a hay bale depositing device.

The operation of a conventional mobile hay baler is such that as it advances it collects the hay from the windrow, presses, binds and ties it in rectangularly shaped bales, which are then deposited on the ground at the rear of the baler. A row of bales is thus left behind the baler. The baler may be followed by a loader which picks up the bales and loads them onto a truck body or the like for the purpose of transporting them to storage. The operation of the loader is such that the loading is facilitated if the bales are deposited in alignment behind the baler.

Most mobile hay balers are of considerable length extended rearwardly from the wheels and the delivery end thereof must be sufficiently high above the ground so that uneven ground surfaces may be traversed. The result is that a delivered bale dropped from the trailing end of the baler often falls a considerable distance in proportion to the dimensions of the bale. The bale may then land upon its end or upon a corner so as to tip it and cause it to fall at an angle to or even crossways of the normal forward path of travel so as to complicate and impede the operation of loading the misaligned bales into a truck body or the like which follows the baler.

It is the principal object of the invention to provide a device mountable near the delivery end of the bale delivering trough of a mobile hay baler to guide each bale as it is dropped to the ground.

Another object is to provide means to cushion ground shock as each bale is dropped to maintain the longitudinal alignment of the successively deposited bales in even rows.

In this connection it is an object of the invention to mount rearwardly extending arms at either side of the delivery trough in position to resiliently embrace each bale as it travels down the trough. The arms are extended beyond the delivery end of the trough, are vertically movable, and are provided with resilient damping means to lower the trailing end of the bale to the ground without excessive shock. This arrangement assures the alignment of each bale with the bales previously deposited to form straight rows of bales ready for pick up.

Other objects will be more apparent to one skilled in the art upon an examination of the following disclosure.

In the drawings:

Fig. 1 is a perspective view of the bale depositing device showing a bale in the course of its deposit.

Fig. 2 is a plan view of the bale depositing device.

Fig. 3 is a cross sectional view taken along the line 3—3 of Fig. 2.

Fig. 4 is a view in spaced apart relationship of the separable elements which comprise the device.

In Fig. 1 the trailing end of a movable hay baler 10 is shown with a delivery trough 11 extending rearwardly therefrom. The trough is well known in the art and may be made integral with the baler or as a separate element hingedly connected thereto. The trough 11 is desirably provided with sides 12 spaced apart a distance slightly exceeding the width of a normal bale of hay 13 which is formed in the baler and which travels down the trough under pressure from succeeding bales and drops to the ground at the rear of the baler when overbalanced on the edge 23 of the trough. Ground friction at the dropped bale edge draws the bale away from the succeeding bale to a position where it is free to drop completely.

For the purpose of depositing the successively formed bales in even longitudinally aligned rows behind the baler, the trough 11 is provided with a bale depositing device which lowers the elevated edge of the deposited bale more or less gently to the ground to reduce ground shock, thereby preventing misalignment of the bales as they are dropped from the baler. The depositing device comprises uprights 14 and 15 which are telescopically receivable in mounted position at either side of the trough upon the upstanding mounting brackets or stanchions 16 and 17. These are bolted or otherwise erectly secured at opposite sides of the trough. The bracket 16 and 17 are spaced outwardly from the respective sides 12 of the trough on lateral extensions 18 and 19 in order to mount the depositing arms clear of the path of the traveling bale 13 and clear of the trough 11 as will be described below. The respective brackets 16 and 17 may be joined beneath the trough by the transversely extending reenforcing and bracing strap 20 which facilitates positioning the respective brackets 16 and 17 in a detachable unitary assembly with the trough. As best shown in Figs. 1 and 2 the upright brackets 16 and 17 are spaced forwardly from the delivery end 23 of the trough 11.

The uprights 14 and 15 are provided with lipped mutually spaced flanges 24 and 25 which provide slideways into which the respective brackets 16 and 17 are telescopically receivable. The lower ends of the uprights 14 and 15 rest upon the lateral extensions 18 and 19 of the respective brackets, and when so positioned the holes 26 and 27 in the respective uprights register with the holes 28 and 29 of the respective brackets. A cotter key 30 or the like may be inserted through the registering holes and its legs diverged to securely anchor the uprights upon the brackets.

The upper ends of the uprights 14 and 15 are provided with rearwardly extending spring or guide arms 33 and 34, respectively, pivoted to the uprights upon transverse pintles 35 and 36. Both arms are swingable upon their pintles in a vertical plane between limits defined by contact of the arms with their respective stop members 37 and 38 which comprise vertically spaced bolts carrying a keeper plate 39 spaced from the upright to form a guideway in which the arms are swingable.

The arms 33 and 34 are made long enough so that their respective bale engaging ends 42 and 43 extend rearwardly beyond the depositing end 23 of the trough. The respective bale engaging ends 42 and 43 of the arms 33 and 34 are inclined or offset toward each other to lie between an extension of the respective sides 12 of the trough 11. The arms are made of resilient but quite stiff spring metal so as to yieldably embrace a bale traveling down the trough.

The arms are biased to their uppermost positions against the upper stop member 37 by means of the tension springs 44 which are connected to the arms intermediate their ends and to rearwardly extending upright brackets 45 positioned at the tops of the brackets 14 and 15.

As may be readily understood, the bale 13 will travel rearwardly down the trough 11 until its edge is more or less simultaneously embraced by the inwardly biased ends 42 and 43 of the respective arms 33 and 34, which will yield outwardly to accommodate the bale. The rearward travel of the bale will be slowed by the frictional effect of the embracing arms and the leading edge of the bale will drop without excessive shock to the ground when the bale overbalances itself upon the delivery edge 23 of the trough. Upon reaching ground contact the bale will be further withdrawn from the trough until its elevated edge clears the end 23 of the trough whereupon the bale will be lowered on the swingable arms to the ground. The bias of springs 44 will resist the dropping of the bale to prevent excessive ground shock so as to deposit the front and rear ends of the bale in longitudinal alignment. In this manner the alignment of the successively deposited bales in even rows is insured. Upon release of the arm ends 42 and 43 from the bale as a consequence of the complete depositing of the bale the resilient springs 44 will return the arms to a position whereby they are in a position to embrace the next succeeding bale.

I claim:

1. A hay bale depositing device mounted at the delivery end of the bale trough of a hay baler comprising the combination with the delivery trough of arms pivotally mounted at opposite sides of the trough and having free ends extending rearwardly beyond the delivery end of the trough, said free ends being convergent from their mountings toward each other and being resiliently yieldable away from said convergence whereby said free ends are positioned to embrace a bale of hay traveling down the trough, said arms being downwardly swingable on their pivotal mountings to guide said hay bale downwardly beyond the delivery end of the trough.

2. The device of claim 1 in further combination with means connected to said arms yieldably to restrain downward vertical movement of the arms.

3. The device of claim 2 wherein the arm mountings comprise paired uprights fixed at transversely opposite sides of the trough and spaced from its delivery end, and wherein said guide arms are pivotally mounted on said uprights to extend longitudinally of the trough with the bale engaging ends of the arms disposed rearwardly beyond said trough delivery end, said uprights being provided with stop members for limiting swingable movement of the arms on the pivots and with said yieldable means between the arms and uprights for biasing the arms in uppermost position.

4. A hay bale depositing device comprising an upright having portions provided with means for mounting the upright at one side of a hay baler delivery trough, a single arm pivoted at one end to said upright near its upper end and swingable in substantially the plane of the upright, the free end of the arm being offset with respect to the pivoted end of the arm in an inward and rearward direction to lie behind a trough on the side of which the upright is mounted, and a spring connected at one end to the upright and at its other end to the arm whereby to resiliently bias the arm to its uppermost swung position.

5. The device of claim 4 further provided with spaced stop members on the upright, said arm having a portion disposed between said stop members and movable thereagainst to limit the swing of the arm on its pivot.

6. The device of claim 4 wherein the upright comprises telescopically related sections, one section being adapted for fixed mounting at the side of a hay baler trough and the other section being provided with the arm and associated elements and being telescopically mounted upon the fixed section.

7. A hay bale depositing device comprising spaced uprights connected at corresponding ends by a transverse mounting strap, dual arms independently pivoted at their forward ends to respective uprights and having their rear ends free and projecting in open space, said arms being swingable in substantially parallel planes normal to the transverse strap, the free ends of the arms being inclined toward each other, each of said arms being provided with a spring connected to the upright to yieldably bias the arm to its uppermost swung position.

8. A hay bale depositing device comprising the combination with a baler delivery trough having paired upright brackets mounted at transversely opposite sides thereof, said brackets being provided with lateral extensions to space the brackets outwardly of the trough sides, of paired uprights provided with slideways for telescopically positioning the upright on the brackets and dual arms pivotally mounted near the upper ends of the respective uprights and swingable in substantially parallel planes including the uprights, said arms being extended rearwardly of the trough end and having bale engaging ends inclined toward each other to embrace a bale traveling down the trough, said uprights being provided with stop members limiting swingable movement of the arms, and resilient means between the arms and uprights to yieldably bias the arms to uppermost position.

9. An attachment for the delivery end of a conveyor and adapted to lower articles leaving the conveyor to a level below the conveyor, said attachment comprising arms having mountings on which the arms are pivoted at opposite sides of the conveyor for downward swinging movement, said arms also being convergent from their mountings towards each other and being resiliently yieldable away from said convergence, the ends of said arms being free and projecting rearwardly of the end of the conveyor, the space between the arms being downwardly open, whereby the arms may embrace an article traveling down the conveyor and may swing vertically on their pivots whereby to guide said article as it is discharged from the conveyor and drops to said lower level.

10. The device of claim 9 in further combination with means resiliently supporting said arms against such downward swinging movement.

GEORGE A. VOIGHT.

References Cited in the file of this patent

UNITED STATES PATENTS

| Number | Name | Date |
|---|---|---|
| 195,489 | Crompton et al. | Sept. 25, 1877 |
| 2,327,264 | Hendrickson | Aug. 17, 1943 |
| 2,390,306 | Hunziker | Dec. 4, 1945 |
| 2,410,516 | Messenger et al. | Nov. 5, 1946 |

FOREIGN PATENTS

| Number | Country | Date |
|---|---|---|
| 17,252 | Australia | Dec. 19, 1928 |